Sept. 11, 1945.　　　C. C. FUERST　　　2,384,615
CAMERA SHUTTER
Filed Sept. 4, 1943　　　2 Sheets-Sheet 1
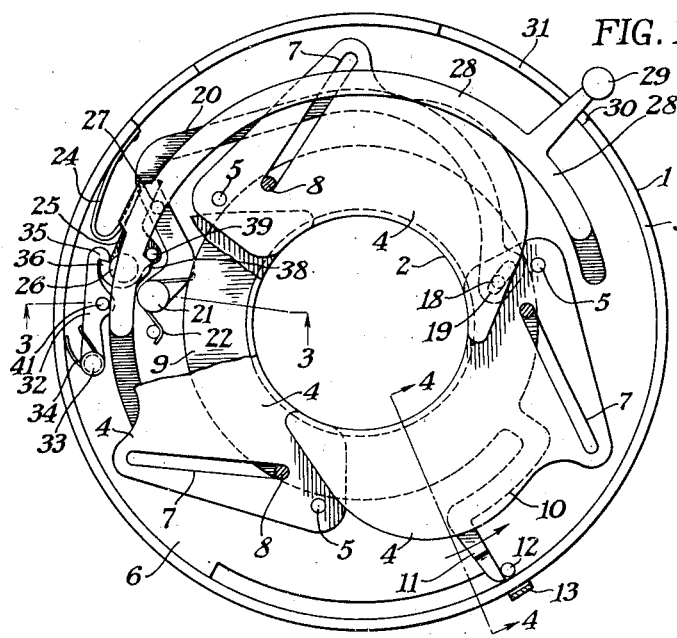
FIG. 1.
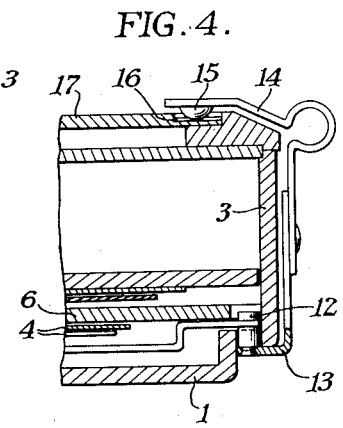
FIG. 4.
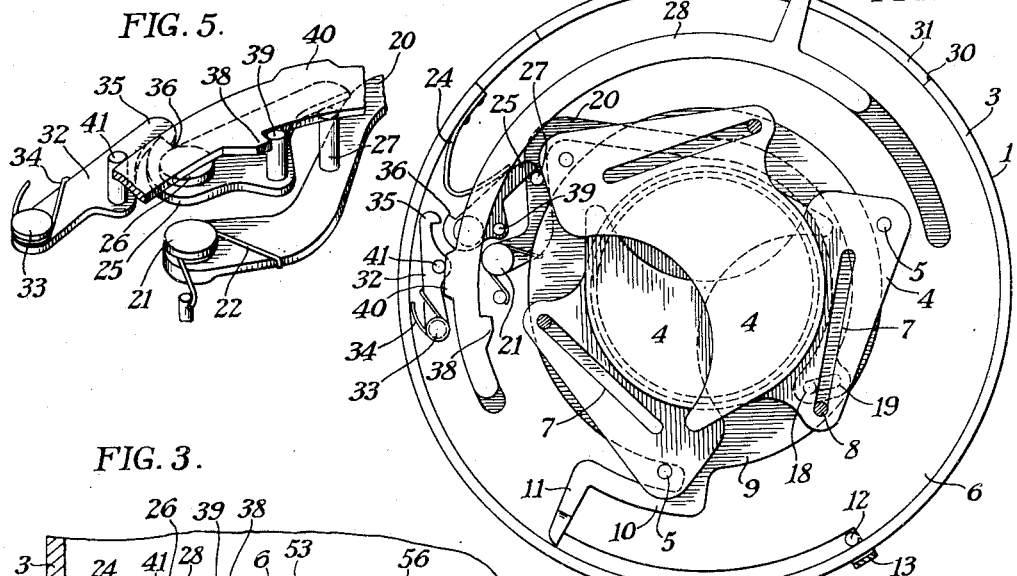
FIG. 5.
FIG. 2.
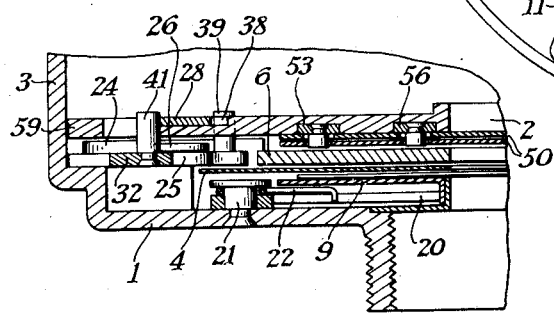
FIG. 3.
CARL C. FUERST
INVENTOR
BY
ATTORNEYS Sept. 11, 1945.   C. C. FUERST   2,384,615
CAMERA SHUTTER
Filed Sept. 4, 1943   2 Sheets-Sheet 2

CARL C. FUERST
INVENTOR
BY
ATTORNEYS

Patented Sept. 11, 1945

2,384,615

UNITED STATES PATENT OFFICE 2,384,615

CAMERA SHUTTER

Carl C. Fuerst, Rochester, N. Y., assignor to Eastman Kodak Company, Rochester, N. Y., a corporation of New Jersey Application September 4, 1943, Serial No. 501,239

13 Claims. (Cl. 95—63)

This invention relates to photography and more particularly to camera shutters. One object of my invention is to provide a shutter with which extremely high speed exposures can be obtained. Another object of my invention is to provide a shutter in which the shutter leaves normally cover an exposure aperture in which additional protection across the exposure aperture is provided. Another object of my invention is to provide a shutter of the type in which the shutter blades open and close during the setting movement of the shutter and in which a supplementary means is provided covering the exposure aperture during the setting movement of the shutter blades. Still another object of my invention is to provide a shutter diaphragm system in which the diaphragm leaves move to the desired aperture only just before an exposure is to be made and in which the diaphragm leaves normally cover the exposure aperture at all other times. Other objects will be found from the following specification, the novel features being pointed out in the claims at the end thereof.

In shutters of the between-the-lens type employing five or six shutter blades the overlap between the blades is kept to a minimum and, in addition, it is customary to make shutter blades of extremely thin material as for instance .002" in thickness. When such shutters are properly made and properly handled there is little, if any, difficulty due to light leak. However, some users may unduly expose the shutter to light with the sun shining on the shutter blades and, consequently, there is sometimes a tendency for the film to be fogged by light leak. It is, therefore, desirable to provide an additional means for protecting film against unwanted light and this is particularly true because of the modern excessively fast photographic film which requires only extremely little light to fog the film.

It has been found that it is possible to obtain a much higher speed exposure with a shutter of the type in which the shutter blades move only in one direction about their pivots in making an exposure. One difficulty, however, with such shutters is that unless the shutter blade is passed through substantially 360° the shutter blades must open and close during the setting operation. While it is in many ways desirable to have the shutter blades make one complete rotation, such construction requires a shutter casing too large to go into most modern cameras.

For these reasons, I have provided a shutter in which the shutter blades move only in one direction in making an exposure and move in an opposite direction during the setting movement. During the setting movement I provide a novel type of diaphragm which will completely close to cover the exposure opening during the setting. In addition, I have provided a shutter diaphragm which normally completely covers the exposure aperture of the shutter but which moves to an open position and to a predetermined stop only just before the exposure is made. Thus this construction not only serves to provide additional protection for the film, but it also serves the usual function of a diaphragm to define the aperture of the lens and to cover the exposure aperture when the shutter blades open and close in setting the shutter.

Certain features of this shutter are similar to the following of my copending applications: Serial No. 489,484, Camera shutter, filed June 3, 1943; Serial No. 489,485, Diaphragm shutter, filed June 3, 1943.

Coming now to the drawings wherein like reference characters denote like parts throughout:

Fig. 1 is a top plan view of a shutter with certain parts removed illustrating a diaphragm constructed in accordance with and embodying a preferred form of my invention. The diaphragm leaves are shown in an open position;

Fig. 2 is a view similar to Fig. 1 but showing the diaphragm leaves in their normal completely closed position;

Fig. 3 is an enlarged sectional view taken on line 3—3 of Fig. 1;

Fig. 4 is an enlarged sectional view taken on line 4—4 of Fig. 1;

Fig. 5 is a fragmentary perspective view of the diaphragm leaf driver;

Figure 6:
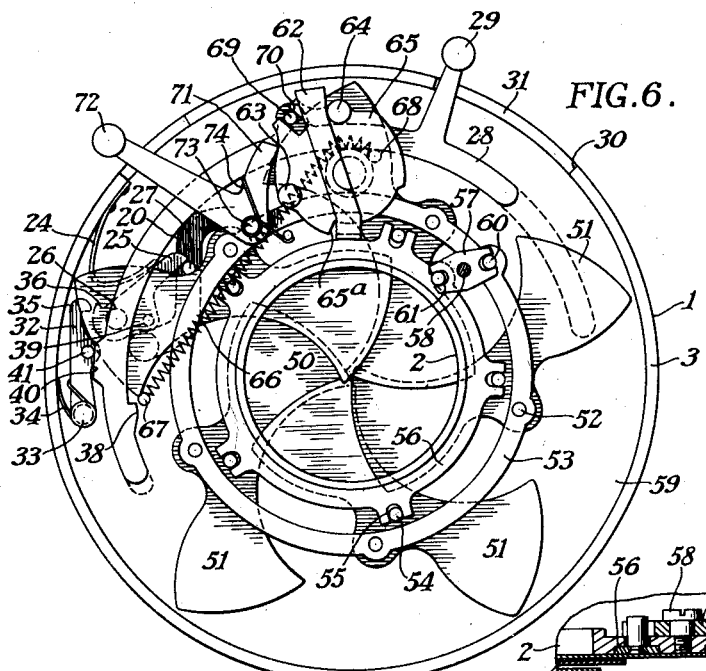
Fig. 6 is a view similar to Fig. 1, but showing a preferred form of shutter blade driving mechanism.
Figure 8:
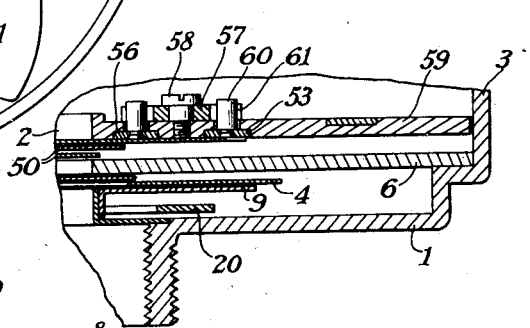
Fig. 8 is an enlarged fragmentary sectional view taken on line 8—8 of Fig. 7.

My shutter may be briefly described as a between-the-lens shutter of the type in which the master member must be set before an exposure can be made. In addition, the shutter blade construction is somewhat unusual in that the shutter blades open and close during the setting movement so that a supplementary closure for the exposure aperture is required. In accordance with this invention the supplemental closure is formed from diaphragm leaves which remain closed at all times except when the shutter has been set at which time the diaphragm blades automatically open to a predetermined stop. As soon as the exposure is completed the shutter leaves immediately return to their closed position.

As a preferred embodiment of my invention I have shown a shutter having the usual type of shutter casing 1 including a central aperture 2 and an upstanding flange 3 extending around the periphery of the shutter casing.

The shutter diaphragm in the present instance may consist of three shutter leaves 4 each of which is pivotally mounted at 5 to a mechanism plate 6 and each of which includes a slot 7 for the reception of a pin 8. The three pins 8 are carried by a diaphragm ring 9 mounted to oscillate about the exposure opening 2 and including an offset arm 10 terminating in a radially disposed arm 11 which is positioned to strike a pin 12 carried by an arm 13 as best shown in Fig. 4. This arm includes a spring finger 14 having a lug 15 adapted to drop into any one of a series of notches 16 which are positioned on the shutter cover 17 and which determine the diaphragm openings.

The diaphragm ring 9 also carries a pin 18 entering a slot 19 in the lever 20 which is pivoted at 21 to the mechanism plate 6 and which is normally moved by a spring 22 in a counterclockwise direction with respect to Fig. 1 so as to bring the arm 11 up against the adjustable stop pin 12.

The spring 22, however, is considerably weaker than the spring 24 which moves a lever 25 which constitutes a diaphragm driver in a direction to oppose the action of the spring 22. Thus the diaphragm driver 25 which is pivoted on a stud 26 tends to turn in a clockwise direction so as to press upon a pin 27 on the lever 20 to close the shutter aperture 2. If not restrained the driver 25 will hold the shutter leaves closed in the condition indicated in Fig. 2. However, the driver 25 can be restrained when the shutter setting lever 28 is in the set position shown in Fig. 1 with the setting handle 29 near the end 30 of the slot 31 in the flange 3.

When in this position the driver 25 is held against movement by a spring latch 32 pivoted at 33 to the mechanism plate and having a spring 34 turning it in a clock-wise direction with respect to Fig. 1. This causes the latch element 35 to engage a latch element 36 on the driver 25 and prevent it from being moved by the spring 24. When this happens the spring 22 opens the diaphragm leaves 20 and diaphragm ring 9, swinging the diaphragm ring 9 until the arm 11 strikes the pin 12. In Fig. 1 the diaphragm is shown in its fully-opened position which occurs only when the handle 29 has reached its set position. If the stop 12 had been located in any other position, it would not have permitted the diaphragm leaves to open as far as shown. The opening of course depends on the setting of the diaphragm adjusting member 13 which is, as above explained, retained in its set position through the engagement of protuberance 15 in notch 16 in the shutter cover 17.

The position of the driver 25, as well as the position of the latch 35, is controlled by the setting member 28. The setting member 28 controls the position of driver 25 by means of a cam 38 which may engage the upstanding pin 39 of the driver and, as will be seen from Figs. 1 and 2, when the shutter is set the cam 38 through its engagement with the pin 39 has swung the driver 25 into its latch and therefore inoperative position; whereas when the shutter is in an unset or run-down position, as illustrated in Fig. 2, since the cam 38 is removed from its position engaging pin 39 the driver 25 is permitted to turn under the influence of its spring 24 thereby pressing on pin 27 of the diaphragm lever 20 and causing the diaphragm leaves 4 to assume their fully-closed position shown in this view. At the same time of course the lever 11 carried by the diaphragm ring 9 moves to the opposite end of the slot through which the pin 12 may pass.

The setting lever 28 controls the position of the latch 35 by means of a cam 40 which may engage a pin 41 on the pivoted lever 32. The position of this cam is such that when the setting lever 28 is in its unset or run-down position of Fig. 2, the cam 40 is in engagement with the pin 41 and thus holds the latch 35 away from its latching position and away from the latch 36 of the driver 25. However, when the handle 29 is moved from its Fig. 2 toward its Fig. 1 position it is obvious that the pin 41 will rest on the cam 40 only during a portion of this movement and as soon as the cam 40 is moved past the pin 41 it may move toward an operative position and into engagement with the driver 25. Continued movement of the handle 29 causes the cam 38 to engage the pin 39 of the driver 25 and turn it counter-clockwise against the pressure of spring 24 until the latch elements 35 and 36 engage. This engagement occurs about the time the handle 29 reaches its Figure 1 position and, since pressure is released on the diaphragm lever 20, the spring 22 is now able to open the diaphragm leaves until the arm 11 reaches the stop 12. The shutter diaphragm is now ready for an exposure.

Figure 7:
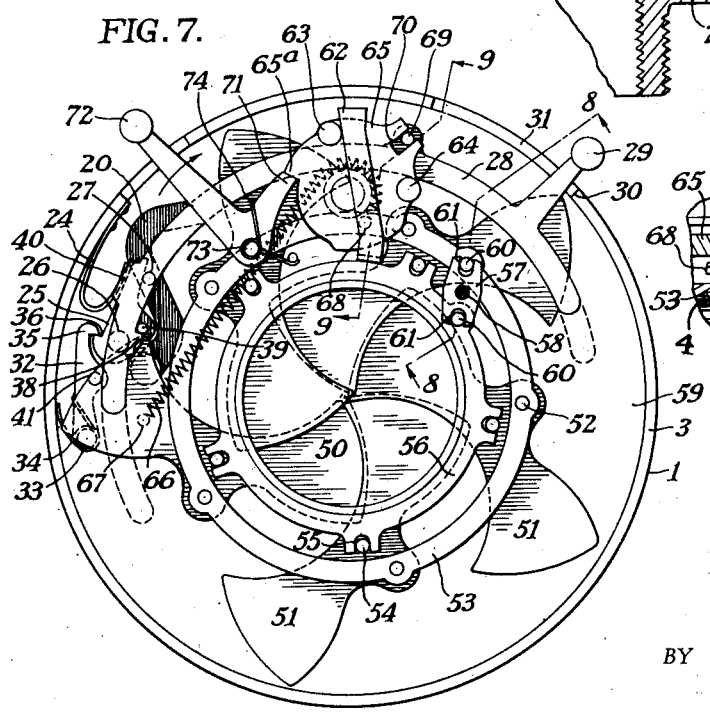
Fig. 7 is a view similar to Fig. 6 but with the shutter shown in a set condition.
Figure 9:
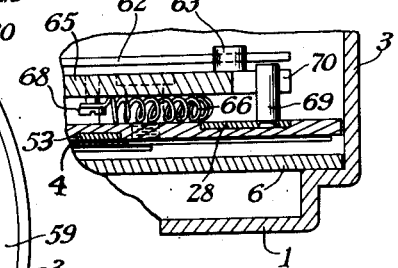
Fig. 9 is a fragmentary sectional view on line 9—9 of Fig. 7.

Figs. 6 and 7 show a typical shutter blade operating mechanism with the parts in a run-down position and with the parts in a set position. The exposure aperture 2 may be covered by a plurality of shutter blades 50 of the double-ended type. That is, each shutter blade 50 has a pair of spaced portions 51 adapted to close and open the exposure aperture 2 and each shutter blade may be pivoted at 52 to a movable blade ring 53 and may have a pin 54 and slot 55 connection with a second blade ring 56.

These two blade rings 56 and 53 may be mounted to move together and in opposite directions by means of the lever 57 pivoted at 58 to the mechanism plate 59 and having a pin 60 and slot 61 connection with the blade rings. One of the blade rings, here shown as a narrow blade ring 56, is provided with a generally radially extending arm 62 which lies in the path of a pair of pins 63 and 64 carried by a master member 65 which may be turned in a counter-clockwise direction by a spring 66 anchored at 67 to the mechanism plate 59 and anchored to the master member by means of a pin 68. When the master member turns under the impulse of its power spring 66, which may occur when the shutter is set as in Fig. 7, the pin 64 flies around and strikes the lever 62 after the pin 63 has moved in a clockwise direction, so that by striking lever 62 the blade ring 56, and with it the blade ring 53, is moved. Since movement is transmitted through the rocker arm 57 the blade rings move in opposite directions so that the blades move from their Fig. 7 to their Fig. 6 position. As the blades swing the exposure aperture 2 is uncovered and then covered and an exposure may be made.

When the parts reach their run-down or Fig. 6 position the shutter blades will be closed and, since the setting lever 28 has moved away from a position in which the cam 38 engages the pin 39 of the driver 25, this driver is released and its spring 24 may turn it in a clockwise direction about its pivot 26, thus causing the diaphragm leaves to move to their Fig. 2 position. In this position both the shutter blades and the diaphragm leaves lie across the exposure aperture 2 and form a double light-tight closure therefor.

When an exposure is to be made the handle 29 of the setting lever 28 is moved from the Fig. 6 to the Fig. 7 position. Since the setting lever 28 is provided with a pin 69 which engages the slot 70 of the master member, by moving the handle 29 in a clockwise direction the master member 65 is wound up at the same time tensioning the spring 66. Since this movement causes the pin 63 to strike the arm 62 it oscillates the blade rings 56 and 53 and the blades open and close. However, the diaphragm leaves 4 remain closed during this movement as, it will be noted from Fig. 2, the cam 38 moves quite a distance before striking the pin 39. Contact between the cam 38 and pin 39 is made only after the shutter blades have opened and closed and consequently slight additional movement of the handle 29 will rock the blade ring driver 25 in a counter-clockwise direction, so that it may become latched through the latch element 35 and the latch element 36. This renders the blade lever driver inoperative and, in addition, it permits the spring 22 to act on the lever 20 to open the blades until the arm 11 strikes the pin 12. Thus the shutter is ready for an exposure and the master member is held in a set position by means of its latch element 65a which is engaged by the latch element 71 of the shutter trigger 72. This trigger is roughly an L-shaped lever pivoted at 73 to the shutter and having a spring 74 normally turning the trigger in a clockwise direction into engagement with the master member.

With the shutter parts in their set position shown in Figs. 1 and 7 an exposure may be made by pressing the trigger 72 in a counter-clockwise direction.

The operation of my shutter is extremely simple. Assuming that an exposure has been made and the shutter parts are in their Fig. 2 and Fig. 6 positions, the exposure aperture 2 is covered by the shutter blades 74 and the diaphragm leaves 4. This provides a double light-tight cover for the exposure aperture 2. When it is desired to make an exposure the operator merely moves the setting handle 29 from the Fig. 2 and Fig. 6 positions to Fig. 1 and Fig. 7 positions. As this movement starts the shutter blades 74 open and close, and about the time the shutter blades close the cam 38 strikes the pin 39 and swings the diaphragm driver 25 in a counter-clockwise direction. It will be latched as soon as the latch elements 35 and 36 engage, this movement being permitted because the setting lever 28 has moved away from the position in which the cam 40 engages the pin 41. As the driver 25 is moved it releases pressure upon the pin 27 and allows the spring 22 of lever 20 to slowly swing the lever causing the shutter blades to open to a predetermined stop which is selected by moving the pin 12 through the setting arm 14 and by engaging the protuberance 15 with the proper detent 16. Therefore, by the time that the handle 29 is moved to its full extent of movement, not only has the master member power spring 66 been tensioned but the shutter blades 74 have opened and closed while the exposure aperture 2 is still covered by the diaphragm leaves 4. In addition, the diaphragm leaves 4 have been permitted to open. The shutter is now ready for an exposure with the master member latched in its tensioned position by means of the latch elements 70—71.

An exposure is made by depressing the trigger releasing latch elements 70—71 and permitting the master member to swing rapidly upon its pivot 165 under the impulse of its power spring 66. All of these operations take place in much less time than it takes to describe them and, as will be noted from the above description, there is no difference so far as the operator is concerned in the operation of this shutter over any of the standard shutters of the setting type. This shutter, however, differs from the standard shutters of the setting type in that at all times, except when the shutter is set for an exposure, the exposure aperture 2 is covered with a double layer of light protecting material—that is the shutter blades 74 and the diaphragm leaves 4. It is only when the shutter is set that the diaphragm leaves are opened and this occurs only at the extreme end of the setting movement. Not only does this permit shutter blades of a type capable of extremely high speeds, but it also provides an added protection against light leaking through the exposure aperture which occasionally may occur if the camera is misused. These functions are accomplished with but few extra parts since I have used the leaves which also serve as diaphragm leaves for affording this added light protection.

While I have described a preferred embodiment of my invention it is obvious that my automatic diaphragm leaf construction can be used with various different known types of shutter blades and shutter blade actuating mechanisms. It is of course not necessary that the shutter blade leaves open and close during the setting movement of the shutter, and in fact my improved diaphragm driving mechanism can be used satisfactorily with other types of shutters as, for instance, the shutter blade driving mechanism shown in Patent 2,099,866, Riddell, granted November 23, 1937. This patent shows a well-known type of shutter blade operating mechanism in which the shutter blades move only when the master member is moving in an exposure making direction so that these shutter leaves do not open during the setting movement. If used with such a shutter the diaphragm is only useful as added light protection; whereas if used with the type of shutter blade mechanism shown and described in this application it has the additional function of preventing light from entering the exposure aperture while the shutter leaves are being set.

I claim:
1. In a shutter for cameras of the type including a casing, shutter blades in the casing, mechanism for moving the blades including a setting lever and a power spring, the setting lever moving in one direction to set the spring and in an opposite direction when the spring is released, and movably mounted diaphragm leaves carried by the shutter casing, the combination with said diaphragm leaves, of a latch carried by the shutter and lying in the path of movement of the shutter setting lever, a driver for the diaphragm leaves operably connected to the diaphragm leaves for moving them, a latch element on the driver, a lug carried by the setting lever for moving the driver and with it the latch element into engagement with the latch carried by the shutter to hold the driver in an inoperative position, and means operable when the shutter setting member moves in an opposite direction when the spring is released for releasing the latch carried by the shutter.

2. In a shutter for cameras of the type including a casing, shutter blades in the casing, mechanism for moving the blades including a setting lever and a power spring, the setting lever moving in one direction to set the spring and in an opposite direction when said spring is released, and movably mounted diaphragm leaves carried by the shutter casing, the combination with said diaphragm leaves, of a latch carried by the shutter and lying in the path of movement of the shutter setting lever, a driver for the diaphragm leaves operably connected thereto for moving the diaphragm leaves, a latch element on the driver, a lug carried by the setting lever for moving the driver and with it the latch element into engagement with the latch carried by the shutter to hold the driver in an inoperative position, and a spring for opening the diaphragm leaves when the driver approaches a latched position, said spring being overcome by said driver when said driver is unlatched, and means operable by the setting member moving in a releasing direction for releasing the latch carried by the shutter.

3. In a shutter for cameras of the type including a casing, shutter blades in the casing, mechanism for moving the blades including a setting lever and a power spring, the setting lever moving in one direction to set the spring and in an opposite direction when the spring is released, and movably mounted diaphragm leaves carried by the shutter casing, the combination with said diaphragm leaves, of a latch carried by the shutter and lying in the path of movement of the shutter setting lever, a driver operably connected to the diaphragm leaves for moving the diaphragm leaves, a latch element on the driver, a lug carried by the setting lever for moving the driver and with it the latch element into engagement with the latch carried by the shutter to hold the driver in an inoperative position, a spring for opening the diaphragm leaves when the driver is in a latched position, said driver and spring each tending to move the diaphragm leaves in an opposite direction, the driver spring being stronger than the spring for opening the diaphragm leaves, and means operated by the setting lever moving in a releasing direction for releasing the latch carried by the shutter.

4. In a shutter for cameras of the type including a casing, shutter blades in the casing, mechanism for moving the blades including a setting lever and a power spring, the setting lever moving in one direction to set the spring and in an opposite direction when the spring is released, the combination with movably mounted diaphragm leaves carried by the shutter casing, of a latch carried by the shutter and lying in the path of movement of the shutter setting lever, a driver operably connected to the diaphragm leaves for moving the diaphragm leaves, a latch element on the driver, a lug carried by the setting lever for moving the driver and with it the latch element into engagement with the latch carried by the shutter to hold the driver in an inoperative position, a spring for moving the driver and through the driver the diaphragm leaves in one direction to close the diaphragm, a second spring much weaker than the driver spring tending to move the diaphragm blades in an opposite direction for opening the diaphragm leaves, and means operable by the setting lever moving in a releasing direction for releasing the latch carried by the shutter casing.

5. In a shutter of the type including a casing, shutter blades in the casing, mechanism for moving blades including a setting lever and a power spring, the setting lever moving in one direction to set the spring and in an opposite direction when the spring is released, the combination with movably mounted diaphragm leaves carried by the shutter casing, of a latch carried by the shutter and lying in the path of movement of the shutter setting lever, a driver operably connected to the diaphragm leaves for moving the diaphragm leaves toward a closed position, a latch element on the driver, a lug carried by the setting lever for moving the driver and with it the latch element into engagement with the latch carried by the shutter to hold the driver in an inoperative position, a spring for moving the driver and through the driver the diaphragm leaves, a second spring much weaker than the driver spring tending to move the diaphragm leaves in an opposite direction to open the diaphragm, and a lug carried by the setting member for releasing the driver latch element when the setting lever moves as the power spring is released, whereby said driver may close the diaphragm.

6. A shutter for cameras of the type including a casing, shutter blades in the casing, mechanism for moving the blades including a setting lever and a power spring, the setting lever moving in one direction to set the spring and in an opposite direction when the spring is released, the combination with movably mounted diaphragm leaves carried by the shutter casing, of a latch carried by the shutter and lying in the path of movement of the shutter setting lever, a driver operably connected to the diaphragm leaves for moving the leaves, a latch element on the driver, a lug carried by the setting lever for moving the driver latch element into engagement with the latch carried by the shutter to hold the driver in an inoperative position when said setting lever approaches its set position, means for releasing the latch element controlled by the setting lever moving in a releasing direction, a spring for moving the driver and through the driver the diaphragm leaves in one direction to close the diaphragm leaves, a second spring much weaker than the driver spring tending to move the diaphragm blades in an opposite direction to open the diaphragm leaves, and a second lug carried by the setting lever for moving and releasing the latch carried by the shutter to release the driver from its inoperative position when the setting lever is moved by the power spring to make an exposure, whereby the diaphragm may open under the influence of its weak spring when the driver is latched and in his inoperative position, and whereby the diaphragm may close when the driver is unlatched as the setting lever moves in an opposite direction when the spring is released.

7. A shutter for cameras of the type including a casing, shutter blades in the casing, mechanism for moving the blades including a setting lever and a power spring, the setting lever moving in one direction to set the spring and in an opposite direction when the spring is released, the combination with movably mounted diaphragm leaves carried by the shutter casing, of a latch carried by the shutter and lying in the path of movement of the shutter setting lever, a driver operably connected to the diaphragm leaves for moving the diaphragm leaves, a latch element on the driver, said driver lying in the path of movement of the setting lever, a lug carried by the setting lever for moving the driver latch element into engagement with the latch of the shutter to hold the driver in an inoperative position, a spring for moving the driver and through the driver the diaphragm leaves in one direction to close the diaphragm leaves, a second spring much weaker than the driver spring tending to open the diaphragm blades, a lug carried by the setting member positioned for releasing the driver latch when the setting lever moves to a position of rest as the power spring operates the shutter mechanism, whereby said driver may close the diaphragm after an exposure is made, and a second lug carried by the setting lever for moving the driver into an inoperative latched position when the setting lever is moved toward its set position to set the power spring, and an adjustable stop for determining the diaphragm opening, said second weak diaphragm leaf spring opening the diaphragm leaves to a predetermined opening determined by the adjustable stop as the setting lever approaches its set position.

8. In a shutter for cameras of the type including a casing, shutter blades in the casing, mechanism for moving the blades including a setting lever and a power spring, the setting lever moving in one direction to set the spring and in an opposite direction when the spring is released, movably mounted diaphragm leaves carried by the shutter casing, the combination with said diaphragm leaves, of a latch carried by the shutter and lying in the path of movement of the shutter setting lever, a driver operably connected to the diaphragm leaves for moving the diaphragm leaves, a latch element on the driver, a lug carried by the setting lever positioned for engaging and moving the driver latch element into engagement with the latch carried by the shutter during the last part of the setting movement of the setting lever to hold the driver in an inoperative position, and means under the control of the setting lever moving in a releasing direction for tripping the latch carried by the shutter, whereby said diaphragm leaves may be moved by the driver to a closed position.

9. In a shutter for cameras of the type including a casing, shutter blades in the casing, mechanism for moving the blades including a setting lever and a power spring, the setting lever moving in one direction to set the spring and in an opposite direction when the spring is released, and movably mounted diaphragm leaves carried by the shutter casing, the combination with said diaphragm leaves, of a latch carried by the shutter and lying in the path of movement of the shutter setting lever, a driver operably connected to the diaphragm leaves for moving the diaphragm leaves towards a closed position, a latch element on the driver, a lug carried by the setting lever and positioned for engaging and moving the driver latch element into engagement with the latch carried by the shutter during the last part of the setting movement of the setting lever to hold the driver in an inoperative position, and a latch releasing lug carried by the setting lever and positioned for releasing said latch when the setting lever is moved in an exposure-making direction with the power spring, whereby the driver may close the diaphragm leaves.

10. In a shutter for cameras of the type including a casing, shutter blades in the casing, mechanism for moving the blades including a setting lever and a power spring, the setting lever moving in one direction to set the spring and in an opposite direction when the spring is released, and movably mounted diaphragm leaves carried by the shutter casing, the combination with said diaphragm leaves, of a latch carried by the shutter casing and lying in the path of movement of the shutter setting lever, a driver operably connected to the diaphragm leaves for moving the diaphragm leaves, a latch element on the driver, a lug carried by the setting lever positioned for engaging and moving the driver latch element into engagement with the latch carried by the shutter to hold the driver in an inoperative position during the last part of the setting movement of the setting lever, means carried by the setting lever for holding the latch out of its latching position when the setting lever is in a position of rest after the power spring is released, whereby said driver may close the diaphragm leaves.

11. In a shutter for cameras of the type including a casing, shutter blades in the casing, mechanism for moving the blades including a setting lever and a power spring, the setting lever moving in one direction to set the spring and in an opposite direction when the spring is released, and movably mounted diaphragm leaves carried by the shutter casing, the combination with said diaphragm leaves, of a latch carried by the shutter and lying in the path of movement of the shutter setting lever, a driver operably connected when the diaphragm leaves for moving the diaphragm leaves, a latch element on the driver, said driver lying in the path of movement of the setting lever, a lug carried by the setting lever for moving the driver latch element into engagement with the latch carried by the shutter to hold the driver in an inoperative position during the last part of the setting movement of the setting lever to place the power spring under tension for exposure, the position of the lug carried by the setting lever being such as to contact the driver and move the latch carried thereby, and means under the control of the setting lever moving in an opposite direction for tripping the latch carried by the shutter enabling the driver to again move the diaphragm leaves to a closed position after an exposure is made.

12. In a shutter for cameras of the type including a casing, shutter blades in the casing, mechanism for moving the blades including a setting lever and a power spring, the setting lever moving in one direction to set the spring and in an opposite direction when the spring is released, and movably mounted diaphragm leaves carried by the casing, the combination with said diaphragm leaves of a latch carried by the shutter and lying in the path of movement of the shutter setting lever, a driver operably connected to the diaphragm leaves for moving the diaphragm leaves to a normal closed position, means included in the driver for engagement with said latch carried by the shutter for holding said driver in an inoperative position only after the shutter setting lever has been moved a predetermined distance in a direction to set the power spring, and means included in said setting lever for holding the latch carried by the shutter in an inoperative position after the setting lever has moved a predetermined distance in an opposite direction when the spring is released, whereby the diaphragm leaves may have a normal closed position to which they are moved by the driver after an exposure is made.

13. In a shutter for cameras, the combination with a shutter casing having an exposure aperture therein, of a first spring-operated mechanism, a trigger for releasing said first spring operated mechanism, a setting lever movable in one direction for setting the spring of the first spring-operated mechanism, and movable in an opposite direction when said spring is released, a diaphragm, a second spring means for moving the diaphragm to an open position, a third spring means for moving the diaphragm to close the aperture, said second spring means acting against and having less power than said third spring means, and means carried by the shutter setting lever for determining the direction of the second and third spring means upon the diaphragm, said means carried by the setting lever rendering the third spring means acting on the diaphragm inoperative when said setting lever approaches its set position, and when said setting lever moves in an opposite direction when released, rendering said third spring-actuated mechanism operative to automatically close the diaphragm leaves to close the exposure aperture.

CARL C. FUERST.